July 1, 1930.                    S. I. FEKETE                    1,768,550
                                 OIL PURIFIER
                              Filed June 28, 1926
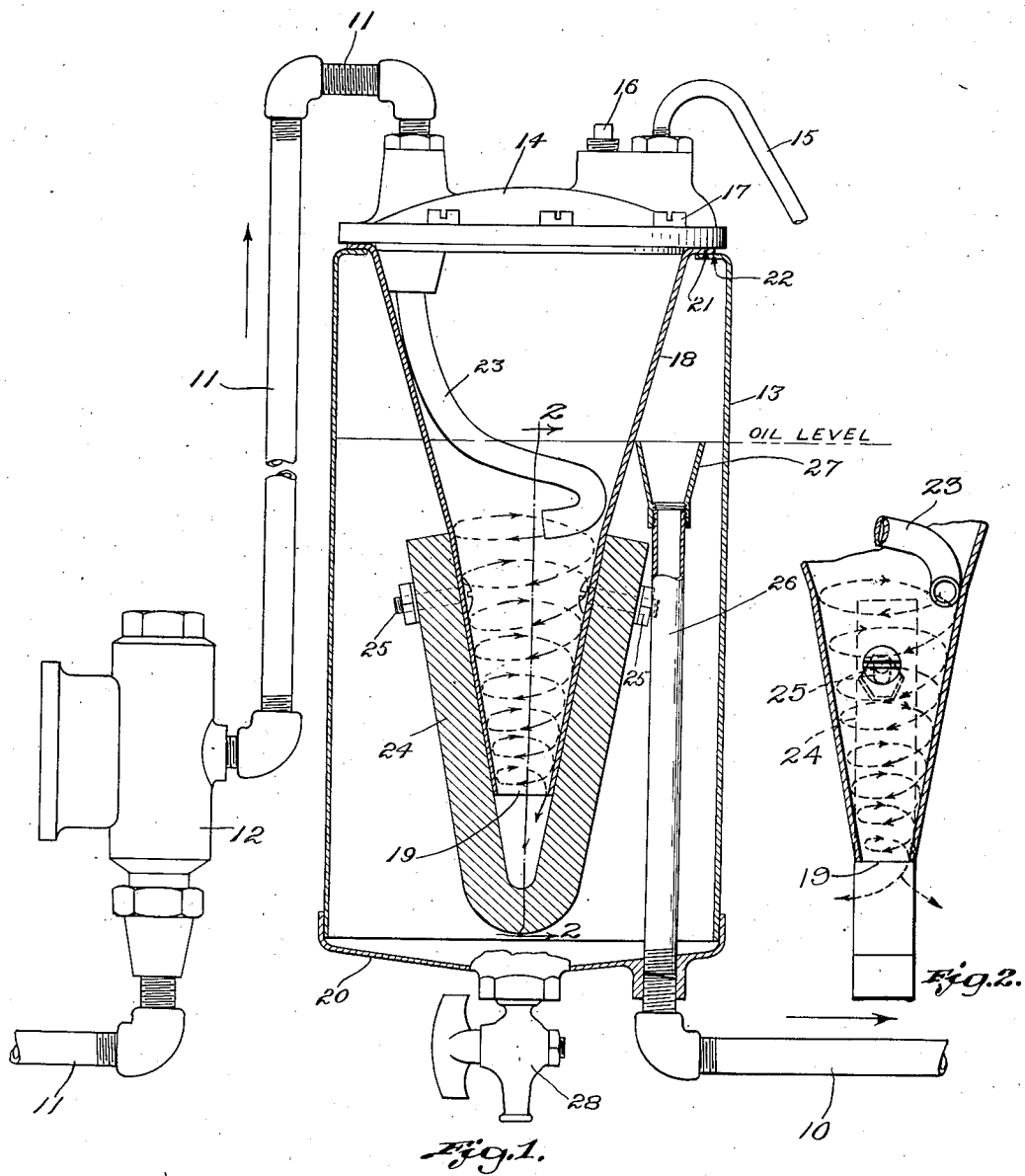
INVENTOR=
Stephen I. Fekete,
By Macleod, Calver, Copeland & Dike,
ATTORNEYS Patented July 1, 1930

1,768,550

UNITED STATES PATENT OFFICE

STEPHEN I. FEKETE, OF DETROIT, MICHIGAN, ASSIGNOR TO HUDSON MOTOR CAR COMPANY, OF DETROIT, MICHIGAN, A CORPORATION OF MICHIGAN

OIL PURIFIER

Application filed June 28, 1926. Serial No. 119,063.

This invention relates to devices for separating solids carried in suspension by liquids, and especially, although not exclusively, to means for purifying the lubricating oil of an internal combustion engine. The invention has for its object to provide a simple and efficient device for removing from the oil during its circulation to and from the engine the solid particles which are too fine to be removed by the usual filtering devices. These particles, which are at least in part of a metallic nature, resulting from the wearing of the bearings, form a silt-like slime which tends to clog the oil passages, materially detracts from the lubricating qualities of the oil, and constitutes one of the causes of the necessity of frequent renewal of the oil.

The more particular objects of the invention, together with means whereby the latter may be carried into effect, will best be understood from the following description of a preferred form thereof illustrated in the accompanying drawing. It will be understood however that the particular construction described and shown has been chosen for purposes of exemplification merely, and that the invention, as defined by the claims hereunto appended, may be otherwise embodied without departure from the spirit and scope thereof.

In said drawings:

Fig. 1 is a diagrammatic view of a portion of the oil circulating system of an automobile engine, including an oil purifier embodying the invention, said purifier being shown partly in vertical section.

Fig. 2 is a section on the line 2—2, Fig. 1.

The lubricating system shown includes pipes 10 and 11 through which the oil is circulated in the direction of the full line arrows to and from the working parts of the engine respectively by a suitable oil pump generally indicated at 12. The oil purifier to which the invention relates may be included in the circulating system at any convenient point, preferably between the pump and the crank case.

Said purifier as shown comprises a settling tank 13 having a removable cover 14 provided with an oil inlet with which the pipe 11 communicates. The cover 14 is also preferably provided with a suitable breather or air vent 15 and with a filling opening normally closed by a plug 16. Said cover may be detachably secured to the tank by any suitable means, such as cap screws 17.

Depending within the tank 13 from the upper part thereof is a preferably annular baffle 18 herein shown as of conical form having an open but contracted lower end 19, said baffle being of less depth than the tank 13 so that the lower end 19 of the former is spaced above the bottom 20 of the latter. The baffle 18 is removably secured within the tank, being preferably formed at its upper edge with an annular flange 21 which is clamped between the removable cover 14 and an inturned flange 22 at the upper edge of the tank.

The oil inlet through the cover 14 communicates with the interior of the baffle 18 through a nozzle 23 so arranged as to direct the incoming oil in a helical path downwardly through said baffle to the lower end 19 thereof.

Immediately outside the baffle 18, or at the side thereof opposite the oil inlet, is a magnet 24 arranged to withdraw magnetic metallic particles from the oil during the downward flow of the latter through the baffle by attracting said particles against the inner side of the baffle. As shown, the magnet 24 is a permanent magnet having its poles secured, as by bolts 25, directly to the outer face of the baffle so as to be removable with the latter from the tank.

The oil outlet from the tank comprises a standpipe 26 discharging through the bottom 20 and having an open upper end 27 disposed outside the baffle 18, or at the opposite side thereof from the inlet, and above the lower end 19 of said baffle, so as to maintain the liquid in the tank substantially at the level indicated.

The bottom 20 of the tank is provided with a pet cock 28 through which the tank can be drained or the accumulated sediment withdrawn from the bottom thereof.

In operation, the oil entering the tank is directed by the nozzle 23 in a helical path downwardly through the interior of the baffle 18 to the lower end 19 thereof as indicated by the dotted arrows. This helical movement of the incoming oil causes the same, and particularly the metallic particles therein, to tend to hug the inner wall of the baffle so as to bring said particles into the sphere of attraction of the magnet 24 which therefore causes said particles to be withdrawn from the liquid and to accumulate on the inner face of the baffle. The oil leaving the lower end of the baffle is directed downwardly toward the bottom of the tank from which it rises to the upper end 27 of the standpipe 26, overflowing into the latter and passing outwardly through the bottom of the tank. This reversal in the direction of flow of the oil adjacent the bottom of the tank causes the non-magnetic particles and such magnetic particles as may not have been withdrawn by the magnet to be separated out by gravity and to settle in the bottom of the tank so that the oil rising in the latter and passing out through the standpipe will have been purified of all solids carried in suspension, either magnetic or otherwise. The sediment accumulating in the bottom of the tank may be periodically withdrawn through the pet cock 28, and the baffle 18 with its magnet 24 may also from time to time be lifted out of the tank, by removing the cover 14, and freed of the accumulation of magnetic matter adhering thereto.

Having thus described my invention, I claim:

1. A purifier for lubricating oil and the like including a settling tank, means including an inlet in the upper part of the tank and a baffle within the tank for inducing downward flow therein, magnetic means above the bottom of said tank for withdrawing metallic particles from the oil during its downward flow and retaining the same in said tank, and means for withdrawing the purified oil from the upper end of the tank.

2. A purifier for lubricating oil and the like including a settling tank having an inlet in the upper part thereof and a baffle in proximity to which the oil flows downwardly from said inlet, a standpipe in said tank having an open upper end in the upper part of the tank and a lower end discharging through the bottom of the tank, and magnetic means for withdrawing metallic particles from the oil during its passage through the tank and causing them to adhere to said baffle.

3. In a purifier for lubricating oil and the like, a tank, a baffle removably supported within the tank, an inlet arranged to discharge the incoming oil against one side of said baffle, and a magnet carried by said baffle at the opposite side thereof and removable therewith.

4. In a purifier for lubricating oil and the like, a tank, an annular baffle removably supported within the tank, an inlet arranged to discharge the incoming oil within the baffle, and a magnet in the tank immediately outside the baffle.

5. In a purifier for lubricating oil and the like, a tank, an annular baffle supported within the tank, an inlet arranged to discharge the incoming oil within the upper part of said baffle, said tank having an outlet outside said baffle and above the lower end thereof, and a magnet in the tank immediately outside the baffle.

6. A purifier for lubricating oil and the like including a settling tank, a baffle removably supported within the tank, an inlet in the upper part of the tank arranged to discharge against one side of said baffle and to induce a downward flow in the tank, a magnet in the tank above the bottom thereof and at the opposite side of said baffle, and means for withdrawing the purified oil from the upper part of the tank.

7. In a purifier for lubricating oil and the like, a tank having a removable cover, an annular baffle having a flange removably held between said tank and cover, said cover having an inlet within the upper part of said baffle, and a magnet carried by and removable with said baffle.

8. In a purifier for lubricating oil and the like, a tank, a conical baffle depending into said tank from the upper part thereof and having an open lower end, an oil inlet within the upper part of said baffle, and a magnet arranged to withdraw metallic particles from the oil during its flow downwardly through said baffle.

9. A purifier for lubricating oil and the like including a settling tank, a conical baffle depending from the upper part of said tank and having an open lower end, an oil inlet within the upper part of said baffle, a magnet arranged to withdraw metallic particles from the oil during its flow downwardly through said baffle, and means for withdrawing the purified oil from the tank outside said baffle and above the lower end thereof.

10. In a purifier for lubricating oil and the like, a tank, a conical baffle removably supported in the upper part of the tank, depending therein, and having an open lower end, an oil inlet within the upper part of said baffle, and a magnet in the tank immediately outside the baffle.

11. In a purifier for lubricating oil and the like, a tank, a conical baffle depending from the upper part of said tank and having an open lower end, an oil inlet within the upper part of said baffle arranged to direct the incoming oil in a helical path downwardly through said baffle, and a magnet arranged to attract the metallic particles in the oil against the inner side of said baffle and cause the same to adhere thereto.

12. A purifier for lubricating oil and the like including a settling tank, a conical baffle depending from the upper part of said tank and having a open lower end, an oil inlet within the upper part of said baffle arranged to direct the incoming oil in a helical path downwardly through said baffle, a magnet arranged to attract the metallic particles in the oil against the inner side of the baffle and cause the same to adhere thereto, and means for withdrawing the purified oil from the tank outside said baffle and above the lower end thereof.

13. A purifier for lubricating oil and the like including a settling tank, a removable baffle of less depth than said tank depending thereinto from the upper part thereof, an oil inlet in the upper part of the tank at one side of the baffle, a magnet carried by said baffle for withdrawing metallic particles from the oil during its downward flow past said baffle and causing them to adhere thereto, and an oil outlet at the opposite side of said baffle and above the lower end thereof.

14. A purifier for lubricating oil and the like including a tank, a baffle removably supported within said tank, an inlet arranged to discharge the incoming oil against said baffle and cause the same to flow downwardly in proximity thereto, and a magnet arranged to withdraw metallic particles from said oil and cause them to adhere to said baffle.

15. A purifier for lubricating oil and the like including a tank, a baffle removably supported within said tank, an inlet arranged to discharge the incoming oil against said baffle and cause the same to flow downwardly in proximity thereto, and a magnet arranged to withdraw metallic particles from said oil and cause them to adhere to said baffle, said magnet being carried by and removable with said baffle.

In testimony whereof I affix my signature.

STEPHEN I. FEKETE.